(12) United States Patent
Badding et al.

(10) Patent No.: US 8,440,367 B2
(45) Date of Patent: May 14, 2013

(54) SOLUTIONS FOR SOLID OXIDE FUEL CELL SEAL FAILURES

(75) Inventors: Michael Edward Badding, Campbell, NY (US); Sasha Marjanovic, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1078 days.

(21) Appl. No.: 11/634,282

(22) Filed: Dec. 5, 2006

(65) Prior Publication Data
US 2008/0131739 A1      Jun. 5, 2008

(51) Int. Cl.
| | |
|---|---|
| H01M 2/34 | (2006.01) |
| H01M 8/24 | (2006.01) |
| H01M 2/02 | (2006.01) |
| H01M 2/08 | (2006.01) |
| H01M 8/10 | (2006.01) |
| H01M 2/20 | (2006.01) |
| H01M 2/14 | (2006.01) |

(52) U.S. Cl.
USPC ........... 429/509; 429/453; 429/463; 429/465; 429/469; 429/495

(58) Field of Classification Search ............ 429/34–35, 429/453, 463, 465, 469, 495, 509
See application file for complete search history.

(56) References Cited

U.S. PATENT DOCUMENTS

| | | | |
|---|---|---|---|
| 5,868,918 A | 2/1999 | Adler et al. | |
| 5,939,219 A | 8/1999 | Jansing et al. | |
| 6,042,703 A | 3/2000 | Adler et al. | |
| 6,090,265 A | 7/2000 | Adler et al. | |
| 6,117,288 A | 9/2000 | Adler et al. | |
| 6,165,632 A | 12/2000 | Blum et al. | |
| 6,656,625 B1 * | 12/2003 | Thompson et al. | 429/36 |
| 7,687,090 B2 | 3/2010 | Badding et al. | |
| 2004/0115503 A1 * | 6/2004 | Jacobson et al. | 429/34 |
| 2006/0063659 A1 | 3/2006 | Xue et al. | 501/15 |
| 2006/0160690 A1 | 7/2006 | Cortright et al. | 501/15 |
| 2006/0172875 A1 | 8/2006 | Cortright et al. | 501/15 |

FOREIGN PATENT DOCUMENTS

| | | |
|---|---|---|
| DE | 19857057 | 4/2000 |
| EP | 0983786 A2 | 3/2000 |
| EP | 1211230 A1 | 8/2006 |
| JP | 2005-174714 | 6/2005 |

OTHER PUBLICATIONS

EG&G Services, Fuel Cell Handbook, Oct. 2000, US Department of Energy, Fifth Eiditon, p. 8-1.*
Dec. 18, 2012 Office Action in JP counterpart application #2009-540254.

* cited by examiner

Primary Examiner — Eugenia Wang
(74) Attorney, Agent, or Firm — Svetlana Z. Short

(57) ABSTRACT

A solid oxide fuel cell that is resistant to seal delamination is disclosed. The solid oxide fuel cell comprises, either individually or in combination, a solid electrically non-conductive frame, a seal structure comprising a material capable of preventing a transfer of charge across the seal during fuel cell operation, and a seal comprising a glass frit that is substantially free of oxides of lithium, sodium, or both lithium and sodium. Methods for manufacturing a solid oxide fuel cell are also disclosed.

36 Claims, 4 Drawing Sheets

SOLUTIONS FOR SOLID OXIDE FUEL CELL SEAL FAILURES

BACKGROUND OF THE INVENTION

1. Field of the Invention

The present invention relates to seals for solid oxide fuel cells, and specifically to seals having increased failure resistance over conventional seals.

2. Technical Background

Solid oxide fuel cells (SOFC) have been the subject of considerable research in recent years. Solid oxide fuel cells convert the chemical energy of a fuel, such as hydrogen, into electricity via electro-chemical oxidation of the fuel at temperatures, for example, of about 700 to about 1000° C., and subsequent reaction of the oxidized fuel with oxygen ions formed at the cathode by reduction of molecular oxygen.

A typical SOFC comprises a negatively-charged ion-conducting electrolyte layer sandwiched between a cathode layer and an anode layer. In a conventional design, multiple individual fuel cells are arranged in a stack such that gas-tight seals are needed along the edges of each cell and between the fuel cell stack and associated gas manifolds. The durability of such seals is often limited due to the high temperatures and the reducing and oxidizing gases present during fuel cell operation. In a fuel cell operating environment, conventional sealants, such as cements, do not typically provide the durability requisite for long-term operation of a SOFC. Seals can also be formed from other materials, such as high temperature glass frits.

Solid oxide fuel cells can undergo large thermal cycling and large thermal gradients, inducing thermal stresses in the fuel cell stack components. Seal failure can occur as a result of deterioration of seal materials and/or fracture or delamination of a seal material. Such failure can be detrimental, resulting in the loss of electrical current, damage to fuel cell components, and the escape and/or combination of fuel and reactant gases.

Thus, there is a need to address seal failure and other shortcomings associated with conventional seals and methods for sealing solid oxide fuel cells. These needs and other needs are satisfied by the seals and methods of the present invention.

SUMMARY OF THE INVENTION

The present invention relates to a solid oxide fuel cell, and more particularly to a seal for use in a solid oxide fuel cell and a method of sealing a solid oxide fuel cell. The present invention addresses at least a portion of the problems described above through the use of a novel frame and/or a novel seal.

In a first embodiment, the present invention provides a solid oxide fuel cell comprising a frame, a ceramic electrolyte sheet, and a seal connecting at least a portion of the frame to at least a portion of the ceramic electrolyte sheet, wherein the seal comprises a material capable of preventing a transfer of charge, during fuel cell operation, between both the portion of the frame and the portion of the ceramic electrolyte sheet connected to the seal.

In a second embodiment, the present invention provides a method of making a solid oxide fuel cell comprising providing a frame, providing a ceramic electrolyte sheet, providing a seal; and then positioning the seal such that it is in contact with at least a portion of the ceramic electrolyte sheet and with at least a portion of the frame; wherein the seal comprises a material capable of preventing a transfer of charge during fuel cell operation between both the portion of the frame and the portion of the ceramic electrolyte sheet in contact with the seal.

In a third embodiment, the present invention provides a method of preventing a transfer of charge across a seal of a solid oxide fuel cell comprising providing a frame, a ceramic electrolyte sheet, and a seal; positioning the seal such that it is in contact with at least a portion of the ceramic electrolyte sheet and with at least a portion of the frame; and providing reactants in a manner such that an electrical current is produced; wherein during fuel cell operation, the seal prevents a transfer of charge between both the portion of the frame and the portion of the ceramic electrolyte sheet in contact with the seal.

Additional embodiments and advantages of the invention will be set forth, in part, in the detailed description, figures, and any claims which follow, and in part will be derived from the detailed description or can be learned by practice of the invention. The advantages described below will be realized and attained by means of the elements and combinations particularly pointed out in the appended claims. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate certain embodiments of the present invention and together with the description, serve to explain, without limitation, the principles of the invention. Like numbers represent the same elements throughout the figures.

DETAILED DESCRIPTION OF THE INVENTION

Figure 1:
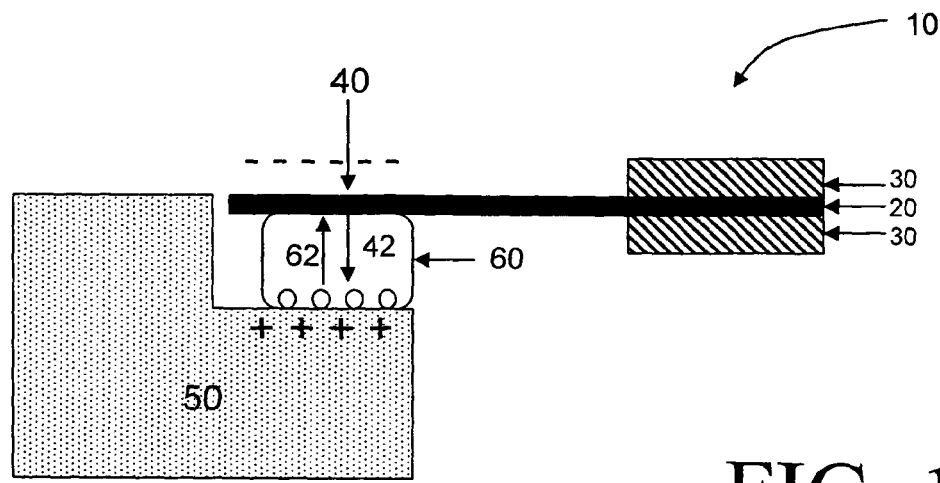
FIG. 1 is a schematic diagram illustrating a cross section of a seal in accordance with one embodiment of the present invention.

The present invention can be understood more readily by reference to the following detailed description, drawings, examples, and claims, and their previous and following description. However, before the present compositions, articles, devices, and methods are disclosed and described, it is to be understood that this invention is not limited to the specific compositions, articles, devices, and methods disclosed unless otherwise specified, as such can, of course, vary. It is also to be understood that the terminology used herein is for the purpose of describing particular embodiments only and is not intended to be limiting.

The following description of the invention is provided as an enabling teaching of the invention in its currently known embodiments. To this end, those skilled in the relevant art will recognize and appreciate that many changes can be made to the various embodiments of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

Disclosed are materials, compounds, compositions, and components that can be used for, can be used in conjunction with, can be used in preparation for, or are products of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and C are disclosed as well as a class of substituents D, E, and F and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all embodiments of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

As used herein, the singular forms "a," "an" and "the" include plural referents unless the context clearly dictates otherwise. Thus, for example, reference to a "component" includes embodiments having two or more such components, unless the context clearly indicates otherwise.

"Optional" or "optionally" means that the subsequently described event or circumstance can or cannot occur, and that the description includes instances where the event or circumstance occurs and instances where it does not. For example, the phrase "optional component" means that the component can or can not be present and that the description includes both embodiments of the invention including and excluding the component.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, a "wt. %" or "weight percent" or "percent by weight" of a component, unless specifically stated to the contrary, refers to the ratio of the weight of the component to the total weight of the composition in which the component is included, expressed as a percentage.

As used herein, a "mole percent" or "mole %" of a component, unless specifically stated to the contrary, refers to the ratio of the number of moles of the component to the total number of moles of the composition in which the component is included.

As used herein, a "frit" or "frit composition," unless specifically stated to the contrary refers to a glass frit and can refer to any physical form of a frit, including a powder, a paste, an extruded bead, and can also refer to an attached or unattached frit deposited on a frame or electrolyte.

The following US Patents and published applications describe various compositions and methods for sealing solid oxide fuel cells, and they are hereby incorporated by reference in their entirety and for the specific purpose of disclosing materials and methods relating to the formation of seals with solid oxide fuel cells: U.S. Pat. No. 7,214,441; and U.S Pat. No. 7,189,470.

As briefly introduced above, the present invention provides an improved seal that, for example, can be useful in sealing a solid oxide fuel cell. The seal of the present invention can have enhanced durability over conventional seals and can be resistant to delamination under typical fuel cell operating conditions.

Although the seals, compositions, and sealing processes of the present invention are described below with respect to the fabrication of a solid oxide fuel cell, it should be understood that the same or similar seals, compositions, and sealing processes can be used in other applications where two materials need to be sealed to one another, for example, to attach a ceramic material to either another ceramic material or to a metal. Accordingly, the present invention should not be construed in a limited manner.

There are several considerations which should be kept in mind when designing a seal that can be used to make a solid oxide fuel cell. Following are some of these considerations:

A seal composition should be capable of forming a seal between, for example, an electrolyte sheet and a frame, at a sealing temperature of from about 700° C. to about 1,000° C. Once formed, a seal should be dimensionally stable at fuel cell operating temperatures, such as from about 600° C. to about 900° C., and through the temperature gradients associated with fuel cell startup and shutdown.

The coefficient of thermal expansion (CTE) of the seal should be substantially matched with that of the electrolyte sheet to limit sealing stresses and thereby eliminate hermeticity loss by fractures in or delamination of the seal. In one embodiment, the seal of the present invention has a CTE of from about $70 \times 10^{-7}/°$ C. to about $120 \times 10^{-7}/°$ C. In another embodiment, the seal of the present invention has a CTE of from about $70 \times 10^{-7}/°$ C. to about $120 \times 10^{-7}/°$ C. over the temperature range of, for example, from ambient to about 1,000° C.

The present invention provides various approaches to minimize and/or prevent seal delamination, including the use of an electrically non-conductive frame, a novel seal structure, and a glass frit seal resistant to ion migration. Each of the approaches referenced above and described in detail below may be employed individually, or in combination, to provide an improved solid oxide fuel cell.

The various seals and methods of the present invention are related in that they minimize or eliminate the transfer of charge across the seal (i.e. between the electrolyte and the frame) during fuel cell operation, a phenomenon not previously associated with seal failure.

Solid Oxide Fuel Cell Device

A conventional solid oxide fuel cell is comprised of a ceramic electrolyte peripherally attached to a frame using, for example, a glass frit seal. The electrolyte can be any ion-conducting material suitable for use in a solid oxide fuel cell. In one embodiment, the electrolyte is comprised of a polycrystalline ceramic such as zirconia, yttria, scandia, ceria, or a combination thereof. In a further embodiment, the electrolyte can optionally be doped with at least one dopant selected from the group consisting of the oxides of Y, Hf, Ce, Ca, Mg, Sc, Nd, Sm, Eu, Gd, Tb, Dy, Ho, Er, Tm, Yb, Lu, In, Ti, Sn, Nb, Ta, Mo, W, or a mixture thereof. In yet a further embodiment, the electrolyte can comprise other filler or processing materials. In a specific embodiment, the electrolyte is comprised of zirconia doped with yttria.

The electrolyte can comprise any geometry suitable for the solid oxide fuel cell being fabricated. In one embodiment, the electrolyte is a sheet. In another embodiment, the electrolyte is tubular. In a preferred embodiment, the electrolyte is a thin sheet comprised of zirconia doped with yttria.

An electrolyte can further comprise at least one anode and at least one cathode, positioned on opposing surfaces of the electrolyte sheet. Electrolytes and electrolyte materials are commercially available (for example, Kerafol GmbH, Eschenbach, Germany) and one of skill in the art could readily select an appropriate electrolyte for a solid oxide fuel cell.

The frame of a conventional solid oxide fuel cell can be any such frame suitable for the design of solid oxide fuel cell being fabricated. The frame should be capable of providing support to the electrolyte sufficient to minimize strain and thus, prevent breakage. The frame of a conventional solid oxide fuel cell can comprise stainless steel such as, for example, 430 stainless steel, 446 stainless steel, E-BRITE® stainless steel, or a combination thereof (available from Allegheny Ludlum Corporation, Pittsburgh, Pa., USA, or Precision Steel Warehouse, Inc., Franklin Park, Ill., USA). The frame can be machined from a suitable frame material, such as 446 stainless steel, to a form suitable for the fuel cell device being fabricated. In one embodiment, the frame can be in the form of a rectangular picture frame with a recessed area sized to accommodate an electrolyte sheet. One of skill in the art could readily select an appropriate frame and/or frame material for a solid oxide fuel cell.

The seal of a conventional solid oxide fuel cell can be any such seal suitable for providing a hermetic seal between the electrolyte and the frame. A conventional seal can comprise a glass seal material, such as a borate-phosphate glass or a borosilicate glass, a glass-ceramic, ceramic, metal (e.g., CuAg), or ceramic-metal brazed seals glass. An exemplary glass seal can comprise borosilicate glass seal material can comprise about 90 wt. % of a strontium-alumina-borosilicate base glass and about 10 wt. % of a filler, wherein the base glass comprises about 4.0 mole % $Li_2O$, about 7.0 mole % CaO, about 18.0 mole % SrO, about 3.0 mole % $Al_2O_3$, about 10.0 mole % $B_2O_3$, and about 58.0 mole % $SiO_2$, and wherein the filler comprises from about 3.0 mole % to about 8.0 mole % $Y_2O_3$ and from about 92.0 mole % to about 97.0 mole % $ZrO_2$. One of skill in the art could readily select an appropriate conventional seal and/or seal material for a solid oxide fuel cell in view of the foregoing exemplary parameters.

Transfer of Charge

During fuel cell operation, an electrochemical potential can be present across at least a portion of the seal (i.e. between the electrolyte and the frame) of a fuel cell device. This potential is a result of the operating voltage generated by the electrochemical reactions occurring within the fuel cell. A fuel cell can comprise a single cell (single cathode and a single anode), or multiple cells connected in series. For example, a fuel cell having a single cell can generate an open circuit voltage of from about 1.0 to about 1.2 volts. The open circuit and operating voltages can be increased if multiple cells are employed and connected in series. Such multiple cells can be arranged in a stack configuration or can be applied as multiple independent electrodes on a single electrolyte sheet, or a combination thereof. For example, a 16 cell device can be fabricated wherein 16 independent anodes are positioned on one surface of an electrolyte sheet and are connected in series, and wherein 16 independent cathodes are positioned on an opposing surface of an electrolyte sheet and are connected in series. The operating voltage of the fuel cell can be less than the open circuit voltage due to resistance of the fuel cell components, charge transfer resistance, polarization effects, and other electrochemical phenomena. In one embodiment, a fuel cell comprises about 16 cells (16 each of anode and cathode) and can generate an open circuit voltage of from about 16 to about 19.2 volts and an operating voltage of from about 12 to about 15 volts. In another embodiment, a fuel cell can comprise up to about 200 cells, for example 2, 5, 10, 20, 40, 80, 100, 120, 160, 190, or 200 cells, and can generate an open circuit voltage of up to about 240 volts and an operating voltage of up to about 180 volts.

In a fuel cell comprising multiple independent electrodes connected in series on a single electrolyte sheet, the voltage increases in order from the first to the last electrode. For example, the open circuit voltage can be about 1.2 volts at the first electrode pair, about 2.4 volts at the second electrode pair, about 3.6 volts at the third electrode pair. Thus, depending upon the geometric pattern in which the electrodes are arranged and the configuration of the electrical circuit, the voltage of such a device can increase from one edge of the device to the opposite edge of the device. In an exemplary 16 cell device, a charge of up to about −3 volts, for example, −0.5, −1.0, −2.0, or −3.0 volts, can accumulate along the seal edge at one side of a fuel cell (e.g., a low voltage side edge of the cell), while a charge of up to about +12 volts, for example, +0.5, +1.0, +2.0, +4.0, +7.0, +9.0, or +12.0 volts, can accumulate along the seal edge at the opposite (e.g., high voltage) side of the fuel cell. Other portions of the seal can remain at neutral or near-neutral electrical bias during fuel cell operation.

Figure 5:
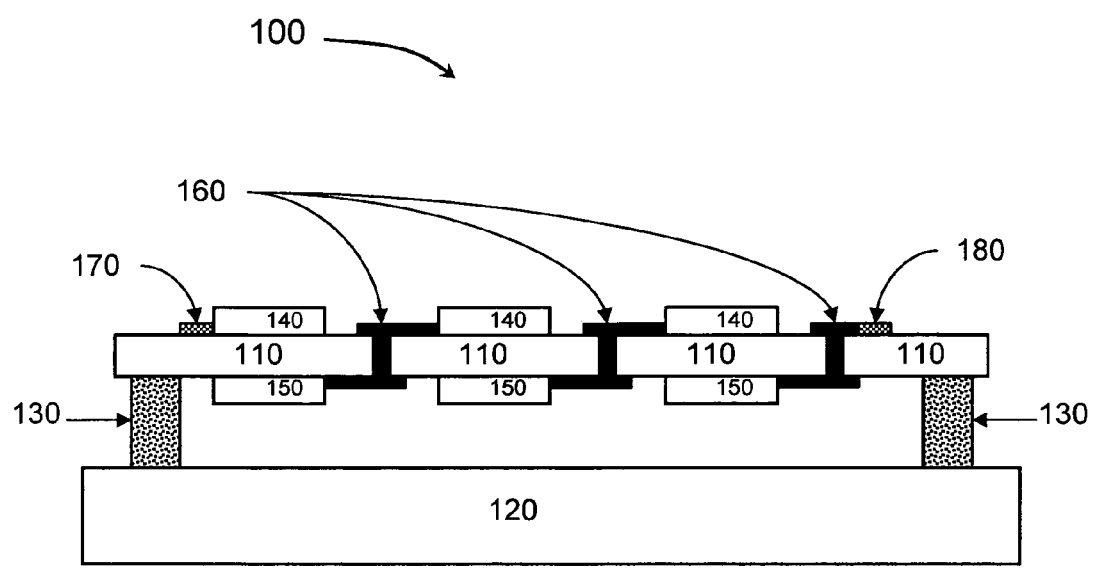
FIG. 5 is a schematic diagram illustrating a cross section of a multi-electrode solid oxide fuel cell in accordance with one embodiment of the present invention.

An exemplary multi-electrode fuel cell device 100 is illustrated in FIG. 5. In such a device, a frame 120 is attached to a ceramic electrolyte sheet 110 with a glass frit seal 130. A plurality of cathodes 140, such as for example three, can be positioned on an air side of the ceramic electrolyte sheet 110 and a plurality of anodes 150, such as for example three, can be positioned on a fuel side of the ceramic electrolyte sheet 110. Each electrode or corresponding pair of electrodes (anode and cathode) can be electrically connected in a series configuration, a parallel configuration, or a combination thereof. Electrical interconnects 160 can be used to make the electrical connections. A cathode bus-bar 170 and an anode bus-bar 180 can be positioned at opposite ends of the ceramic electrolyte sheet.

Depending upon the electrical properties of the electrolyte, seal, and frame, a portion of the device electrochemical potential can be transmitted to the seal area, resulting in the presence of an electrochemical potential difference across the seal. In general, more resistive components (i.e., the electrolyte, the seal, and/or the frame) will reduce degradation of the seal.

Frit Delamination

As charge is transferred across the seal, gas bubbles or blisters can be generated at or near the interface of the glass frit seal and the frame. The formation and appearance of such bubbles can initially occur at one end of the fuel cell and spread towards the opposite end, reaching, for example, about half-way across the fuel cell.

Not wishing to be bound by theory, it is believed that the formation of gas bubbles and subsequent seal delamination occur as a result of ion migration through the glass frit seal under the influence of an electric field created by the transfer of charge between the electrolyte and the frame.

With reference to the drawings, FIG. 1 illustrates a cross-section 10 of an exemplary glass frit seal at the outlet or anode side of a solid oxide fuel cell. During fuel cell operation, an electric field between the negatively charged electrolyte 20 and the positively charged stainless steel frame 50 results in a voltage across the seal that exceeds the electrochemical potential necessary to drive the migration of cations 62 (from the metal oxides of the glass) through the glass frit seal 60 towards the electrolyte 20, leaving behind oxygen ions 42. Oxygen 40 from the cathode side of the fuel cell can be supplied from the oxygen-ion conductive ceramic electrolyte where it can provide additional oxygen ions 42 in the frit necessary to balance the cations migrating through the bulk of the frit. A metal or electrically conductive frame can act as an electron sink, allowing the oxygen ions 42 remaining in the frit to form molecular oxygen. This formed molecular oxygen, if present, can accumulate in bubbles and delaminate the seal from the frame. This accumulated voltage and transfer of charge are distinguished from the operating voltage of a solid oxide fuel cell, generated between the electrodes 30.

At the inlet or cathode side of a solid oxide fuel cell, the voltage potentials across the seal are reversed. A transfer of charge at the cathode side of the fuel cell can result in the formation of bubbles, and thus delamination, between the electrolyte and the glass frit seal.

The likelihood of seal delamination can thus be minimized or eliminated if the fuel cell is designed to prevent the transfer of charge across the seal. The following approaches can be used individually, or in combination, to minimize or prevent the transfer of charge across at least a portion of the seal of a solid oxide fuel cell device. It is not necessary that the device and/or method of the present invention completely prevent the transfer of charge across the seal. The advantages of the present invention can be achieved by preventing the transfer of a portion of charge across the seal. Thus, the devices, methods, and claims of the present invention are not intended to be limited to embodiments where the transfer of charge is completely prevented, but is intended to include embodiments where at least a portion of charge is prevented from transferring across the seal.

Electrically Non-Conductive Solid Frame

The use of conventional metal or electrically conductive frame materials, such as stainless steel, can contribute to the transfer of charge and resulting delamination problems described above. In one embodiment, the present invention provides a solid oxide fuel cell comprising an electrically non-conductive solid frame, a ceramic electrolyte sheet, and a seal connecting at least a portion of the non-conductive solid frame to at least a portion of the ceramic electrolyte sheet. In another embodiment, the solid frame is electrically non-conductive or substantially electrically non-conductive, minimizing or eliminating the transfer of charge across the seal. In another embodiment, the frame is solid and does not comprise channels and/or openings, such as for the transport of reactant gases. In another embodiment, the solid frame comprises a single ceramic or a single mixture of ceramic materials. While the frame should possess sufficient structural strength to support the electrolyte, use of a non-conductive frame can prevent the presence of the initial electric field described above. Further, an electrically non-conductive solid frame is unable to act as an electron sink for oxygen ions located within the glass frit seal and at the frame-seal interface, thus preventing the formation of molecular oxygen and resultant gas bubbles that can lead to delamination.

The non-conductive solid frame can be comprised of any material suitable for use in a solid oxide fuel cell. In one embodiment, the electrically non-conductive solid frame is comprised of a material resistant to hydrogen and/or other fuel gas compositions. In another embodiment, the electrically non-conductive solid frame is comprised of a material that is thermally stable at solid oxide fuel cell operating temperatures and at the temperatures incurred in startup and shutdown of a fuel cell, for example, from about ambient to about 1,000° C., preferably from about ambient to about 800° C., and more preferably from about ambient to about 750° C. In another embodiment, the non-conductive solid frame has a coefficient of thermal expansion (CTE) substantially similar to that of the electrolyte, such as for example, from about $70 \times 10^{-7}$/° C. to about $120 \times 10^{-7}$/° C. over a temperature range of, for example, ambient to about 1,000° C. In one embodiment, the electrically non-conductive solid frame of the present invention does not comprise an electrically conductive portion. In one embodiment, the non-conductive solid frame has a resistivity of at least about $10^6$ ohm-cm at temperatures of from about 750° C. to about 800° C., preferably at least about $10^8$ ohm-cm at temperatures of from about 750° C. to about 800° C.

In one embodiment, the electrically non-conductive solid frame comprises an electrically non-conductive ceramic, glass, or glass-ceramic material, such as, for example, alumina, zirconia, a magnesia-spinel mixture, or a combination thereof. In another embodiment, the non-conducting solid frame can comprise a ceramic, glass, or glass-ceramic material comprising an alumina coating. In a preferred embodiment, the non-conducting solid frame has a CTE substantially similar to the electrolyte. The ability of a coating to protect the seal from undesirable potential gradients depends on both the resistance and thickness of the coating (i.e. the resistance is proportional to the product of the resistivity and the thickness). To achieve desired resistance values, it is preferred that the coating be relatively thick, for example, greater than about 100 μm, more preferably greater than about 1,000 μm. It is preferable that the desired coating area-specific resistance values are at least 1000 $\Omega$-cm$^2$. In one embodiment, desired coating area specific resistance values can range from about 10,000 $\Omega$-cm$^2$ to about 1 M$\Omega$-cm$^2$ (preferably, larger than 10,000 $\Omega$-cm$^2$). Coatings having such high resistance values can keep the potential across the seal sufficiently low to prevent degradation. In terms of potential dropped across the seal, it is desirable for the drop to be less than about 4 volts, more preferably less than about 1 volt, and even more preferably less than about 0.1 volt. An insulating coating, if present, can provide an electrical resistance in series with the seal material. For an insulating coating to be effective in protecting the seal against electrochemical degradation, substantially all of the potential dropped across the seal and the coating together, such as for example, greater than 90%, preferably greater than 60%, or more preferably greater than 99% of the potential dropped across the seal and the coating together should be dropped in the insulating coating. In one embodiment, greater than 90% of the potential dropped across the seal and the coating together is dropped in an insulating coating. In another embodiment, greater than 99% of the potential dropped across the seal and the coating together should be dropped in the insulating coating. The non-conducting solid frame can be fabricated in any form suitable to accommodate a solid oxide fuel cell design. Ceramic, glass, and glass-ceramic materials are readily available (APC International, Ltd., Mackeyville, Pa., USA, or Washington Mills Electro Minerals Company, North Grafton, Mass., USA) and one of skill in the art could readily select an appropriate non-conductive solid frame material.

Seal Structure

In another embodiment, the present invention also provides a solid oxide fuel cell comprising a frame, a ceramic electrolyte sheet, and a seal connecting at least a portion of the frame to at least a portion of the ceramic electrolyte sheet, wherein the seal comprises a material capable of preventing a transfer of charge, during fuel cell operation, between both the portion of the frame and the portion of the ceramic electrolyte sheet connected to the seal.

In this embodiment, the seal of the present invention provides a barrier that prevents a transfer of charge across the seal. In one embodiment, the material capable of preventing a transfer of charge comprises an insulating material. The resistivity of a seal comprising an insulating material can be sufficient to prevent a transfer of charge, such as for example, at least about $10^6$ ohm-cm, preferably at least about $10^7$ ohm-cm, and more preferably at least about $10^8$ ohm-cm at fuel cell operating temperatures of, for example, from about 750° C. to about 800° C. In one embodiment, the insulating material is a separately identifiable material positioned within a glass frit seal.

In another embodiment, the seal comprises a plurality of layers, for example, 2, 3, 4, or more layers, in a stacked arrangement positioned between the electrolyte and the frame. Each of the plurality of layers can be comprised of any materials and can be arranged in any order suitable for use in sealing a solid oxide fuel cell. It is not necessary that the layers comprise identical or similar compositions.

In a further embodiment, at least one of the plurality of layers comprises an insulating layer. An insulating layer can have a resistivity of at least about $10^6$ ohm-cm, preferably at least about $10^8$ ohm-cm at fuel cell operating temperatures of, for example, from about 750° C. to about 800° C. In still a further embodiment, the insulating layer can comprise a ceramic material, such as alumina, zirconia, a magnesia-spinel mixture, other materials having electrical properties similar to alumina and/or zirconia, or a combination thereof. In a preferred embodiment, the CTE of the insulating layer and/or the frit are substantially similar to the CTE of the electrolyte. In a specific embodiment, an insulating layer can comprise an alumina coating. In another embodiment, an insulating layer can comprise a magnesium aluminum spinel.

In another embodiment, the seal comprises a plurality of layers wherein at least one layer is a glass frit. A glass frit layer can comprise any glass frit material suitable for sealing a solid oxide fuel cell, such as the conventional frit composition described above, or the inventive frit composition described below.

In yet another embodiment, the seal comprises at least one frit layer and at least one insulating layer. The frit and insulating layer can be arranged in any order suitable for sealing a solid oxide fuel cell device. The seal can further comprise additional layers. In one specific embodiment, the at least one frit layer is positioned adjacent to the ceramic electrolyte sheet. In another specific embodiment, the frit layer is positioned adjacent to the frame.

Figure 2:
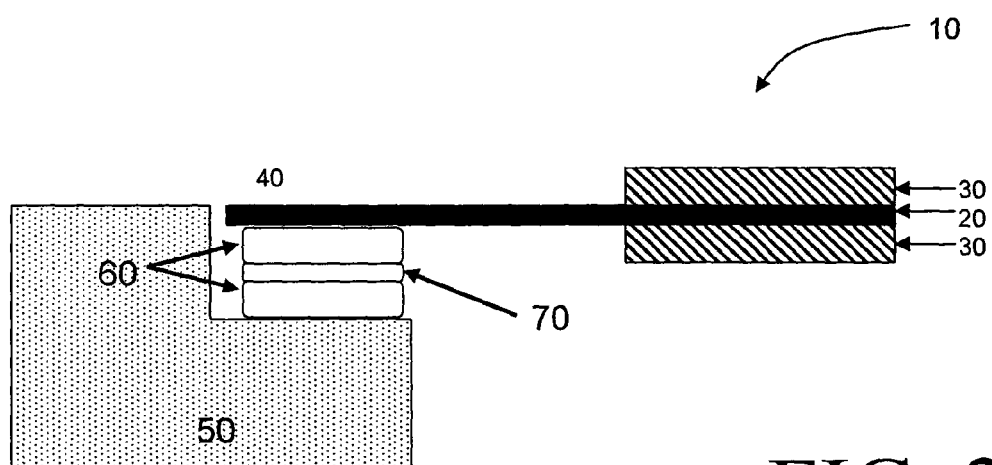
FIG. 2 is a schematic diagram illustrating a cross section of a seal in accordance with one embodiment of the present invention.

In yet a further embodiment, the seal comprises a first and a second frit layer 60, and an insulating layer 70 positioned between the first and second frit layer, as illustrated in FIG. 2. For example, a seal can comprise a first and second frit layer, both comprised of the borosilicate glass frit composition described above, and an insulating layer, wherein the insulating layer is sandwiched between the first and second frit layers. The first and second glass frit layers can also be comprised of varying compositions and are not required to be the same composition. A seal can comprise additional layers and/or materials, if desired for a particular fuel cell device. To achieve desired resistance values, it is preferred that an insulating layer, if present, have a thickness of greater than about 100 μm, more preferably greater than about 1,000 μm. Desired area-specific resistance values can range from about 1,000 Ω-cm$^2$ to, for example about 1 MΩ-cm or higher. In one embodiment, the desired resistance of an insulating layer is greater than about 10,000 Ω-cm$^2$. In another embodiment, the desired resistance of an insulating layer is greater than about 100,000 Ω-cm$^2$.

An insulating layer, if present, can provide an electrical resistance in series with other seal layers and/or materials. For an insulating layer to be effective in protecting the seal against electrochemical degradation, substantially all of the potential dropped across the seal, such as for example, greater than 60%, preferably greater than 90%, or more preferably greater than 99% of the potential dropped across the seal should be dropped in the insulating layer. In one embodiment, greater than 90% of the potential dropped across the seal is dropped in an insulating layer. In another embodiment, greater than 99% of the potential dropped across the seal should be dropped in the insulating layer.

Glass Frit Seal Resistant to Ion Migration

Not wishing to be bound by theory, it is believed that cations having high ionic mobility that are contained in a glass frit can contribute to seal failure. As described above, the transfer of charge across a seal can result in the migration of ionic species through a glass frit. Some ions, such as lithium, have relatively small ionic radii (e.g. 76 pm), and relatively high diffusion coefficients within the glass frit compositions. For example, a molecular dynamic simulation suggests that lithium has a thermal diffusion coefficient of about $9.86 \times 10^{-7}$ cm$^2$/sec in a glass frit comprised of a strontium-alumina-borosilicate base glass and a Yttria stabilized Zirconia (YSZ) filler. In contrast, potassium has a larger ionic radius (e.g. 138 pm) and thus, a simulated thermal diffusion coefficient of about $2.78 \times 10^{-7}$ cm$^2$/sec in a glass frit comprised of a potassium silicate base glass filled with leucite. The movement of lithium can be primarily attributed to a diffusion mechanism wherein lithium ions 'jump' into adjacent available vacant sites in the glass structure. In contrast, larger potassium ions typically occupy well-connected regions with minimal void space for vacancy type diffusion mechanisms. It is believed that potassium diffusion occurs by a slower, site-exchange mechanism.

Thus, the migration of ionic species in a glass frit under a voltage gradient can be reduced or eliminated by selecting an appropriate glass frit material. A glass frit comprised of ions having small ionic radii and high diffusion coefficients will likely have a greater failure rate than a similar glass frit that is substantially free of such ions.

Small alkali ions bound in a ceramic phase are unable to easily move through a portion of a glass frit and are thus less harmful than small alkali ions not bound to a ceramic phase. In one embodiment, the present invention provides a solid oxide fuel cell comprising a frame, a ceramic electrolyte sheet, and a seal connecting at least a portion of the frame to at least a portion of the ceramic electrolyte sheet, wherein the seal comprises a glass frit that is substantially free of alkali ions not bound in a ceramic phase and having an ionic radius less than about 130 pm. A seal can comprise a ceramic phase and a residual glass phase, wherein the residual glass phase is not crystalline, and wherein the residual glass phase is free of or substantially free of alkali ions. In a specific embodiment, a frit can comprise lithium ions, wherein the lithium ions are bound, preferably tightly bound in a ceramic phase, such as zirconia, and wherein the residual glass phase is substantially free of lithium.

In another embodiment, the present invention provides a solid oxide fuel cell comprising a frame, a ceramic electrolyte sheet, and a seal connecting at least a portion of the frame to at least a portion of the ceramic electrolyte sheet, wherein the seal comprises a glass frit that is substantially free of alkali ions having an ionic radius less than about 130 pm. In a specific embodiment, a glass frit is substantially free of lithium.

In another embodiment, the present invention provides a solid oxide fuel cell comprising a frame, a ceramic electrolyte sheet, and a seal connecting at least a portion of the frame to at least a portion of the ceramic electrolyte sheet, wherein the seal comprises a glass frit that is substantially free of alkali ions having an ionic radius less than about 130 pm that are not bound in a ceramic phase. The glass frit can comprise at least one alkali ion having a radius less than about 130 pm, such as, for example, lithium, if the alkali ion is bound, preferably tightly bound, in a ceramic phase so that diffusion of the alkali ion under an electric field is minimized.

In another embodiment, the seal of the present invention comprises a glass frit that is substantially free of oxides of lithium. In yet another embodiment, the seal of the present invention is substantially free of oxides of both lithium and sodium. As used herein, substantially free can refer to less than about 1 wt. %, less than about 1000 ppm, and/or less than about 100 ppm of the alkali, such as sodium and lithium. In these embodiments, the amount of lithium and/or sodium, if present, is less than about 1 wt. %, preferably less than about 1000 ppm, and more preferably less than 100 ppm.

In a further embodiment, the glass frit of the present invention can comprise any combination of other glass and/or doped glass materials capable of forming a hermetic seal between the electrolyte and frame of a solid oxide fuel cell. In another embodiment, the glass frit can have a sealing temperature of from about 700° C. to about 1,000° C., and be stable at solid oxide fuel cell operating temperatures. In another embodiment, the frit is durable upon exposure to the operating environment of a solid oxide fuel cell, including hot fuel and reactant gases.

In an exemplary embodiment, the glass seal can comprise: about 90 wt. % of a potassium silicate base glass and about 10 wt. % of a filler, wherein the base glass comprises about 17.4 mole % $K_2O$, about 0.4 mole % $Na_2O$, about 2.5 mole % $MgO$, about 2.4 mole % $Al_2O_3$, about 0.2 mole % $TiO_2$, and about 77.1 mole % $SiO_2$; and wherein the filler comprises about 13.2 mole % $K_2O$, about 4.8 mole % $Na_2O$, about 18.0 mole % $Al_2O_3$, about 4.8 mole % $TiO_2$, and about 59.2 mole % $SiO_2$.

Preparation of Glass Frit and Seal

The glass portion of the frit can be formed by combining the desired glass components, heating the mixture to a temperature sufficient to melt the components, for example about 1,550° C., allowing the materials to mix, and subsequently cooling the resulting mixture. The resulting composition can be fractured by subjecting it to thermal shock, for example, by pouring cold water or liquid nitrogen over it. If necessary, the fractured pieces can be further crushed and milled (e.g. dry ball-mill) to a desired particle size of, for example, less than about 30 μm, or from about 5.0 μm to about 20.0 μm.

The frit can further comprise a softening temperature and/or CTE adjusting filler; and optionally a paste binder and/or paste filler. The frit can exist in a variety of physical forms, including a powder, a paste, and/or an extruded bead.

Fuel Cell Fabrication

The present invention also provides methods for making a solid oxide fuel cell, in accordance with the above compositions and devices. In one embodiment, the present invention provides a method for making a solid oxide fuel cell comprising: providing a frame, providing a ceramic electrolyte sheet, providing a seal comprising a material capable of preventing a transfer of charge across the seal during fuel cell operation, and then positioning the seal such that it is in contact with at least a portion of the ceramic electrolyte sheet and with at least a portion of the frame. In this embodiment, the seal can comprise one or multiple layers, an insulating layer, a frit layer, or any combination thereof. The seal can also comprise a sandwich of multiple layers, such as, for example, a ceramic insulating layer positioned between two glass frit layers.

In yet a further embodiment, the seal comprises a glass frit that is substantially free of ions having an ionic radius less than about 130 pm, such as lithium and/or sodium.

The present invention also provides a method for preventing a transfer of charge across a seal of a solid oxide fuel cell comprising: providing a frame, providing a ceramic electrolyte sheet, providing a seal, positioning the seal such that it is in contact with at least a portion of the ceramic electrolyte sheet and with at least a portion of the frame, and providing reactants in a manner such that an electrical current is produced, wherein during fuel cell operation, the seal prevents a transfer of charge between both the portion of the frame and the portion of the ceramic electrolyte sheet in contact with the seal.

Although several embodiments of the present invention have been illustrated in the accompanying drawings and described in the detailed description, it should be understood that the invention is not limited to the embodiments disclosed, but is capable of numerous rearrangements, modifications and substitutions without departing from the spirit of the invention as set forth and defined by the following claims.

EXAMPLES

To further illustrate the principles of the present invention, the following examples are put forth so as to provide those of ordinary skill in the art with a complete disclosure and description of how the seals, fuel cells, articles, devices, and methods claimed herein are made and evaluated. They are intended to be purely exemplary of the invention and are not intended to limit the scope of what the inventors regard as their invention. Efforts have been made to ensure accuracy with respect to numbers (e.g., amounts, temperatures, etc.); however, some errors and deviations should be accounted for. Unless indicated otherwise, temperature is ° C. or is at ambient temperature, and pressure is at or near atmospheric. There are numerous variations and combinations of process conditions that can be used to optimize product quality and performance. Only reasonable and routine experimentation will be required to optimize such process conditions.

Example 1

Measurement of Voltage Across Seal

Figure 3:
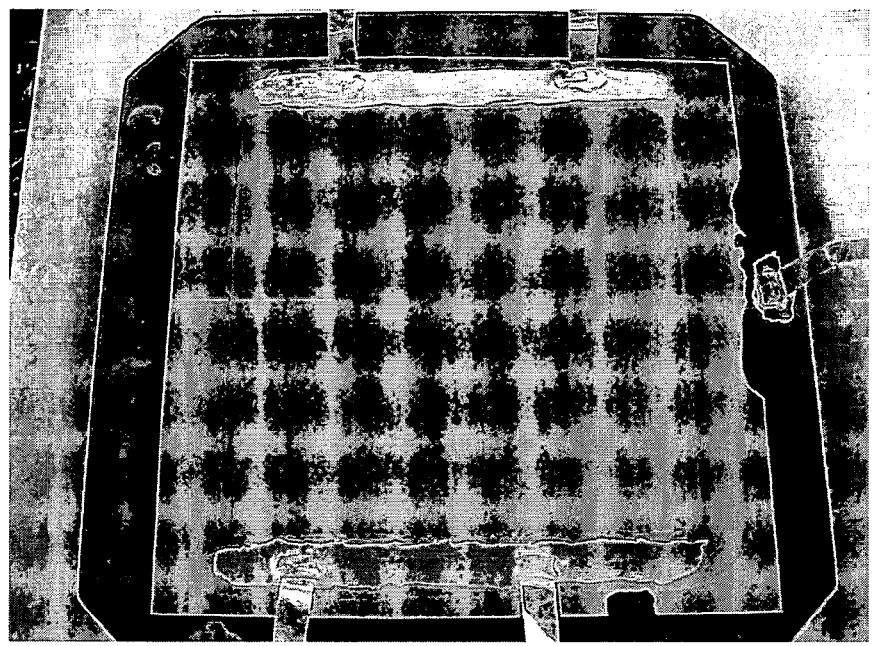
FIG. 3 is an image of a test device fabricated to evaluate a seal failure mechanism in accordance with one embodiment of the present invention.

In a first example, devices were fabricated using varying glass frit seals to evaluate a seal failure mechanism. Each device comprised a 446 stainless steel frame, approximately 7 cm×7 cm, onto which a Yttria Stabilized Zirconia (YSZ) electrolyte sheet was attached using a glass frit seal, as illustrated in FIG. 3. The glass frit seal of Device A comprised about 90 wt. % of a strontium-alumina-borosilicate base glass and about 10 wt. % of a filler, wherein the base glass comprised about 4.0 mole % $Li_2O$, about 7.0 mole % CaO, about 18.0 mole % SrO, about 3.0 mole % $Al_2O_3$, about 10.0 mole % $B_2O_3$, and about 58.0 mole % $SiO_2$, and wherein the filler comprised about 3.0 mole % $Y_2O_3$ and about 97.0 mole % $ZrO_2$.

The glass frit seal of Device B comprised about 90 wt. % of a potassium silicate base glass and about 10 wt. % of a filler, wherein the base glass comprised about 17.4 mole % $K_2O$, about 0.4 mole % $Na_2O$, about 2.5 mole % MgO, about 2.4 mole % $Al_2O_3$, about 0.2 mole % $TiO_2$, and about 77.1 mole % $SiO_2$; and wherein the filler comprised about 13.2 mole % $K_2O$, about 4.8 mole % $Na_2O$, about 18.0 mole % $Al_2O_3$, about 4.8 mole % $TiO_2$, and about 59.2 mole % $SiO_2$.

On each device, silver bars were painted over the sealed portion of the electrolyte and four silver contact pads attached to simulate the accumulation of voltage in the seal area during fuel cell operation. Silver paint was fabricated from a silver-palladium alloy (90:10 wt. %) mixed with an ethyl-cellulose binder and texanol solvent. Each device was placed in a furnace (approximately 750° C.), and external voltages applied as described below, under an air atmosphere.

An external voltage of about −10 volts was applied to the inlet side of each device, while an external voltage of about +10 volts was applied to the outlet side of each device. Voltage and temperature were maintained for one hour, at which time the devices were removed and examined. The glass frit seal of Device A was visibly delaminated such that a piece of paper could be inserted between the electrolyte sheet and the frame. The glass frit seal of Device B had visible bubbles present, but remained intact.

The glass frit of Device A contained lithium, which can migrate through the glass frit under a voltage gradient, contributing to the formation of bubbles and subsequent delamination of a seal. The glass frit of Device B contained potassium, instead of lithium. The smaller ionic radius and faster diffusion coefficient of lithium likely contributed to the failure and delamination of the seal of Device A.

Example 2

Resistivity of Glass-Ceramic Seal Compositions

Figure 4:
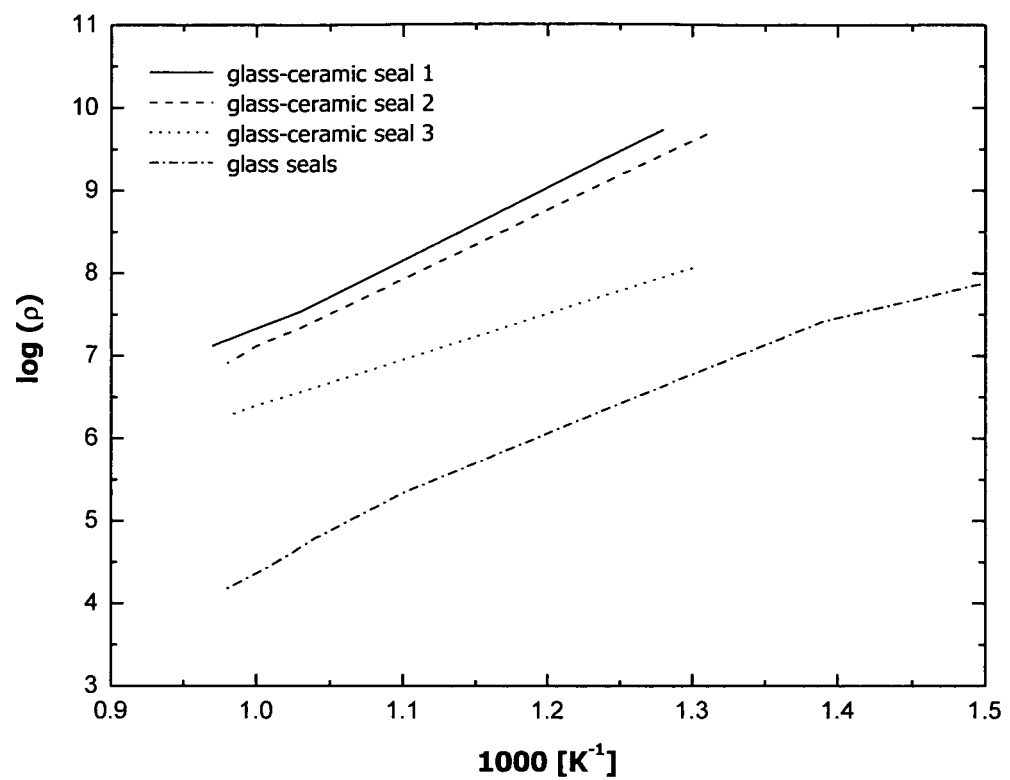
FIG. 4 is a graph of the resistivity of glass and glass-ceramic seal compositions in accordance with various embodiments of the present invention.

In a second example, a series of glass-ceramic seals were prepared comprising the compositions detailed in Table 1. The seals were prepared to illustrate the attainable resistivity of a seal comprising an alkali when the alkali is bound in a ceramic phase. The resistivity of the various seal compositions were then measured, as illustrated in FIG. 4, and compared to a conventional glass seal comprising a lithium doped boron-silicate glass. In glass-ceramic seal 1, the potassium was present in a crystalline Kaliophilite phase that was not present in the other seal compositions.

TABLE 1

| Glass-Ceramic Seal Compositions (weight %) | | | |
|---|---|---|---|
| | Sample | | |
| | 1 | 2 | 3 |
| $Al_2O_3$ | 15.3 | 15.3 | 16.0 |
| CaO | 33.6 | 33.6 | 35.1 |
| $SiO_2$ | 36 | 35.9 | 43.7 |
| $K_2O$ | 4.9 | 4.2 | 5.2 |
| $GeO_2$ | 10.2 | 11.0 | 0 |

As illustrated in FIG. 4, the resistivity of each of the glass-ceramic seals was significantly higher than that of the conventional glass seal. Both glass-ceramic seals 1 and 3 comprised the same amount of $K_2O$ (on a mole % basis), but the high temperature resistivity of glass-ceramic seal 1 was approximately one order of magnitude greater than that of glass-ceramic seal 3. The increased resistivity can be attributed to the fact that the potassium of glass-ceramic seal 1 was present in a crystalline phase and is not a mobile as potassium contained within a residual glass phase.

Various modifications and variations can be made to the compositions, articles, devices, and methods described herein. Other embodiments of the compositions, articles, devices, and methods described herein will be apparent from consideration of the specification and practice of the compositions, articles, devices, and methods disclosed herein. It is intended that the specification and examples be considered as exemplary.

What is claimed is:

1. A solid oxide fuel cell comprising:
a frame;
a ceramic electrolyte sheet comprising a first surface and an opposing second surface, wherein a plurality of positive air electrodes are attached to the first surface and a plurality of negative fuel electrodes are attached to the second surface; and
a seal connecting at least a portion of the frame to at least a portion of the ceramic electrolyte sheet;
wherein the seal comprises a material capable of preventing a transfer of charge, during fuel cell operation, between both the portion of the frame and the portion of the ceramic electrolyte sheet connected to the seal, said material being situated between the portion of the frame and the portion of the ceramic electrolyte sheet connected to the seal, wherein the frame is peripherally attached to the ceramic electrolyte sheet and provides support to the ceramic electrolyte sheet, wherein the material capable of preventing a transfer of charge comprises a glass frit comprising a ceramic phase and a non-crystalline residual glass phase, and wherein the residual glass phase is substantially free of alkali ions, and the alkali ions are bound in the ceramic phase.

2. The solid oxide fuel cell of claim 1, wherein the material capable of preventing a transfer of charge comprises an insulating material.

3. The solid oxide fuel cell of claim 1, wherein the seal comprises a plurality of layers.

4. The solid oxide fuel cell of claim 3, wherein the seal comprises at least one insulating layer.

5. The solid oxide fuel cell of claim 4, wherein the at least one insulating layer has an area-specific electrical resistance greater than about 1,000 $\Omega$-cm$^2$.

6. The solid oxide fuel cell of claim 4, wherein the at least one insulating layer has an area-specific electrical resistance greater than about 10,000 $\Omega$-cm$^2$.

7. The solid oxide fuel cell of claim 4, wherein the at least one insulating layer comprises a ceramic material.

8. The solid oxide fuel cell of claim 4, wherein the at least one insulating layer comprises at least one of alumina, zirconia, spinel, magnesia, or a combination thereof.

9. The solid oxide fuel cell of claim 4, wherein the at least one insulating layer has a resistivity of at least about $10^6$ ohm-cm at about 750° C.

10. The solid oxide fuel cell of claim 4, wherein at least 60% of a potential dropped across the seal, during fuel cell operation, is dropped in the at least one insulating layer.

11. The solid oxide fuel cell of claim 4, wherein at least 90% of a potential dropped across the seal, during fuel cell operation, is dropped in the at least one insulating layer.

12. The solid oxide fuel cell of claim 4, wherein at least 99% of a potential dropped across the seal, during fuel cell operation, is dropped in the at least one insulating layer.

13. The solid oxide fuel cell of claim 3, wherein the seal comprises at least one frit layer.

14. The solid oxide fuel cell of claim 3, wherein the seal comprises at least one insulating layer and at least one frit layer.

15. The solid oxide fuel cell of claim 14, wherein the at least one frit layer is positioned adjacent to the ceramic electrolyte sheet.

16. The solid oxide fuel cell of claim 14, wherein the at least one frit layer is positioned adjacent to the frame.

17. The solid oxide fuel cell of claim 3, wherein the seal comprises a first and second frit layer and an insulating layer, and wherein the insulating layer is positioned between the first and second frit layers.

18. The solid oxide fuel cell of claim 1, wherein the material capable of preventing a transfer of charge comprises the glass frit that is substantially free of the alkali ions not bound in the ceramic phase and having an ionic radius less than about 130 pm.

19. The solid oxide fuel cell of claim 1, wherein the material capable of preventing a transfer of charge comprises the glass frit that is substantially free of alkali ions having an ionic radius less than about 130 pm.

20. The solid oxide fuel cell of claim 19, wherein the glass frit is substantially free of oxides of lithium.

21. The solid oxide fuel cell of claim 19, wherein the glass frit is substantially free of oxides of lithium and sodium.

22. The solid oxide fuel cell of claim 1, wherein the plurality of positive air electrodes and the plurality of negative fuel electrodes are electrically connected in a series configuration, a parallel configuration, or a combination thereof.

23. The solid oxide fuel cell of claim 1, wherein the plurality of positive air electrodes comprises at least five positive air electrodes, and wherein the plurality of negative fuel electrodes comprises at least five negative fuel electrodes.

24. The solid oxide fuel cell of claim 1, wherein the material capable of preventing a transfer of charge comprises an insulating material.

25. The solid oxide fuel cell of claim 1, wherein the frame is in the form of a rectangular picture frame.

26. The solid oxide fuel cell of claim 1, wherein the frame does not comprise channels for transport of reactant gases.

27. The solid oxide fuel cell of claim 1, wherein the frame is made of a substantially electrically non-conductive material.

28. A method of making a solid oxide fuel cell comprising:
providing a frame;
providing a ceramic electrolyte sheet comprising a first surface and an opposing second surface, wherein a plurality of positive air electrodes are attached to the first surface and a plurality of negative fuel electrodes are attached to the second surface; providing a seal; and then
positioning the seal such that it is in contact with at least a portion of the ceramic electrolyte sheet and with at least a portion of the frame;
wherein the seal comprises a material capable of preventing a transfer of charge, during fuel cell operation, between both the portion of the frame and the portion of the ceramic electrolyte sheet in contact with the seal, said materi being situated between the portion of the frame and the portion of the ceramic electrolyte sheet in contact with the seal, wherein the frame is peripherally attached to the ceramic electrolyte sheet and provides support to the ceramic electrolyte sheet, wherein the material capable of preventing a transfer of charge comprises a glass frit comprising a ceramic phase and a non-crystalline residual glass phase, and wherein the residual glass phase is substantially free of alkali ions, and the alkali ions are bound in the ceramic phase.

29. The method of claim 28, wherein the seal comprises a plurality of layers.

30. The method of claim 29, wherein the seal comprises at least one insulating layer.

31. The method of claim 29, wherein the seal comprises at least one insulating layer and at least one frit layer.

32. The method of claim 29, wherein the seal comprises a first and second frit layer and an insulating layer, and wherein the insulating layer is positioned between the first and second frit layers.

33. The method of claim 28, wherein the material capable of preventing a transfer of charge comprises an insulating material.

34. The method of claim 28, wherein the material capable of preventing a transfer of charge comprises the glass frit that is substantially free of alkali ions having an ionic radius less than about 130 pm.

35. The method of claim 28, wherein the material capable of preventing a transfer of charge comprises the glass frit that is substantially free of oxides of lithium.

36. A method of preventing a transfer of charge across a seal of a solid oxide fuel cell comprising:
a) providing a frame, a ceramic electrolyte sheet, and a seal, wherein the frame is peripherally attached to the ceramic electrolyte sheet and provides support to the ceramic electrolyte sheet, and wherein the ceramic electrolyte sheet comprises a first surface and an opposing second surface, wherein a plurality of positive air electrodes are attached to the first surface and a plurality of negative fuel electrodes are attached to the second surface, wherein the seal comprises a material capable of preventing a transfer of charge;

b) positioning the seal such that it is in contact with at least a portion of the ceramic electrolyte sheet and with at least a portion of the frame; and
c) providing reactants in a manner such that an electrical current is produced;

wherein, during fuel cell operation, the material capable of preventing a transfer of charge prevents a transfer of charge between both the portion of the frame and the portion of the ceramic electrolyte sheet in contact with the seal, wherein said material is situated between the portion of the frame and the portion of the ceramic electrolyte sheet in contact with the seal, wherein the material capable of preventing a transfer of charge comprises a glass frit comprising a ceramic phase and a non-crystalline residual glass phase, and wherein the residual glass phase is substantially free of alkali ions, and the alkali ions are bound in the ceramic phase.

* * * * *